UNITED STATES PATENT OFFICE.

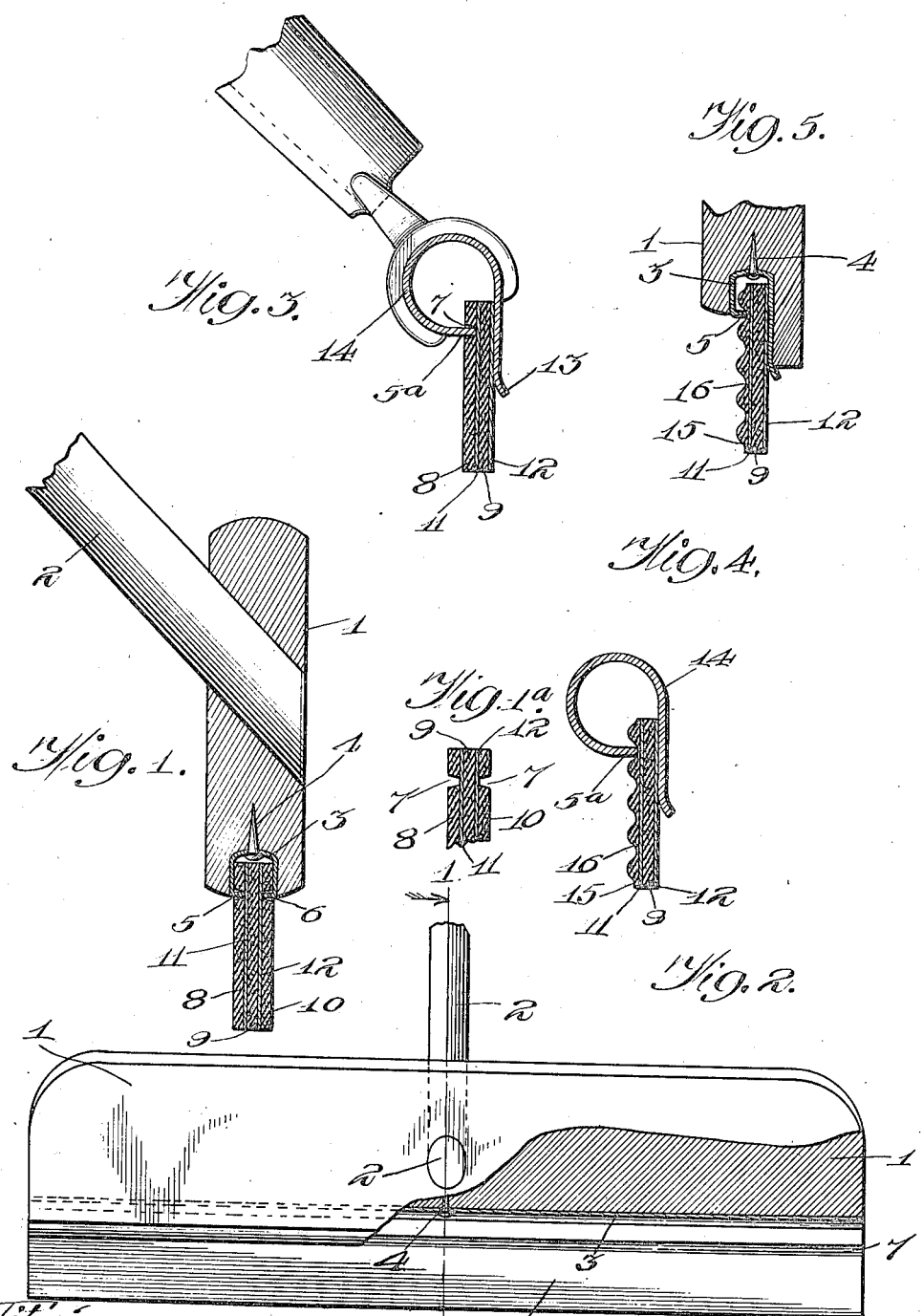

JAMES R. LANE, OF LUDINGTON, MICHIGAN.

SQUEEGEE OR WINDOW-CLEANER.

948,630. Specification of Letters Patent. Patented Feb. 8, 1910.

Application filed June 22, 1905. Serial No. 266,374.

*To all whom it may concern:*

Be it known that I, JAMES R. LANE, a citizen of the United States, residing at Ludington, in the county of Mason and State of Michigan, have invented a new and useful Improvement in Squeegees or Window-Cleaners, of which the following is a specification.

This invention relates to squeegees or wipers for cleaning windows or floors which usually comprise a strip of rubber and a holder therefor.

My invention relates more particularly to the means whereby the wiper is attached to the holder, and it also relates to improvements in the construction of the wiper itself.

One of the objects of the invention is to provide improved means for securing the wiper and holder together.

Another object of the invention is to provide means for securing the wiper and rubber together, and at the same time reduce to the minimum the quantity of rubber required to effect such attachment.

A further object of the invention is to provide an improved construction of the wiper itself, whereby a wiper of the minimum thickness may be employed and yet possess the requisite strength and durability.

With a view to the attainment of these ends and the accomplishment of certain other objects which will hereinafter appear, the invention consists in the features of novelty which will now be described with reference to the accompanying drawing, and more particularly pointed out in the claims.

In the said drawing,—Figure 1 is a cross-section of the holder and the wiper, secured to a head which would ordinarily be constructed of wood; Fig. 1ª is a detail cross-section of the wiper; Fig. 2 is a front elevation of Fig. 1, with a portion of the holder broken away. Fig. 3 is a view similar to Fig. 1 illustrating a modification; and Figs. 4 and 5 are similar views, illustrating still further modifications.

1 is a block or head, to which the handle 2 is attached, and according to one form of my invention this block or head is provided along its lower edge with a longitudinal recess, in which is situated a trough-shaped holder or clip 3, of a cross-section corresponding to the shape and cross-section of the said recess and which may be held in the recess by means of one or more tacks 4, or by any other suitable expedient, the tack or tacks being driven through the bottom of the trough into the wood of the head 1. The edges of the trough-shaped holder 3 are provided with inturned flanges 5, 6, which enter grooves or spaces 7 formed in the faces of the wiper and whereby the wiper is firmly held in place with capability of being removed by sliding it longitudinally. The wiper in this form is composed of three strata of rubber 8, 9, 10, and two strata 11, 12, of canvas, linen cloth, or any other suitable flexible reinforcing material, incorporated with or securely attached to the strata of rubber, and serving not only to reinforce and prolong the life of the wiper, but to form a wearing surface for the edges of the flanges 5, 6, which preferably project through the two outer strata 8, 10, and take their bearings directly against the reinforce strata 11, 12. The outer strata of rubber in this exemplification comprise a plurality of members spaced from each other and secured to the reinforce to form the spaces 7. Consequently the cutting or breaking of the wiper where it is engaged by the flanges 5, 6, is prevented and the life of the device considerably prolonged. It will also be seen that the amount of material at the upper edge of the wiper above the grooves 7, is comparatively small, as no enlargement or extra thickness of the wiper at this point is necessary for making the attachment secure.

In the form of my invention shown in Fig. 3 the wiper is constituted by two strata of rubber 8, 9, and two strata of fabric, or other suitable flexible reinforce, 11, 12, the latter stratum being on the outside instead of on the inside as in Fig. 1, so as to protect the back of the wiper from wear against the lip 13 of the holder. The holder in this form differs from that in the other form in that the longitudinal recess or passage for receiving the upper edge of the wiper is provided with but a single inturned flange, which is indicated at 5ª, and this flange and the lip 13 are formed integrally with the body 14 of the holder, which is not unlike a well known form. In this form it will also be seen that the groove for the holding flange is formed on one side only of the wiper.

In the form shown in Fig. 4 the holder is substantially the same as that shown in Fig. 3, but the wiper is composed of two strata of rubber 9 and 15, the latter of which is corrugated longitudinally, as indicated at 16, so as to produce longitudinal grooves, one of which near the edge is utilized for the engagement of the holding flange 5ª. In addition to these two strata of rubber are employed two strata of reinforcing material 11, 12. The advantage of this form is that when one edge of the wiper is worn beyond usefulness, that is to an extent wearing away the lowermost one of the ribs of the corrugations, it may be slipped out and inverted in the holder, the last perfect groove being utilized for the engagement of the flange 5ª.

In the form shown in Fig. 5 the holder is of the same construction as that shown in Fig. 1, excepting that the flange is on one side only, the wiper being of the construction illustrated in Fig. 4. This method of fastening the wiper in the holder requires only the minimum amount of the wiper to project above the holding flange into the holder, as it obviates the necessity of looping the wiper around an anchor or rod within the holder as a means of attachment. This saves considerable material in the reduction of the width of the wiper while the employment of one or more layers of reinforcing fabric or other suitable substance makes the wiper more durable and increases its wearing qualities, and consequently makes a thinner wiper and a wiper of a lower grade of material available for use.

Having thus described my invention, what I claim as new therein, and desire to secure by Letters Patent, is:

1. In a device of the class described, the combination of a holder and a wiper comprising a body having an imperforate reinforce, said wiper being also provided with a longitudinal groove extending through the body thereof to the reinforce, whereby the reinforce will extend across and form the bottom of the groove, one edge of the wiper being adapted to stand between the edges of the holder with the extremity of one edge of the holder standing within the groove and adjacent the face of the reinforce.

2. In a device of the class described, the combination of a holder, a reversible wiper comprising a body having a reinforcing strip, said wiper being provided with a plurality of longitudinal grooves extending therethrough to the reinforcing strip, whereby the reinforcing strip will form the bottom of the groove, one edge of the holder being adapted to engage one side of the wiper and the other edge being adapted to enter any one of the grooves and engage the face of the reinforcing strip.

3. As an article of manufacture, the herein described wiper for window cleaners and the like, comprising a reinforced body having a groove therein extending to the reinforce, whereby the reinforce will form the bottom of the groove.

4. As an article of manufacture the herein described wiper for window cleaners and the like, comprising a body portion including an imperforate reinforcing strip of textile material, said body having a groove provided with open ends and extending longitudinally of the body and therethrough to the reinforcing strip, whereby the reinforce will form the bottom of the groove.

5. As an article of manufacture, the herein described wiper comprising a body including an imperforate reinforcing strip embedded therein, said body being provided with a plurality of grooves having open ends and extending from the face thereof and into close proximity to the reinforce.

6. The herein described article of manufacture comprising a plurality of strata of rubber, and an imperforate flexible reinforcing material interposed between the strata, the outer stratum of rubber comprising a plurality of members spaced from each other to expose the reinforcing material between the said members, said reinforcing material extending across the space between the members to form the bottom of the space.

7. As an article of manufacture, the herein described wiper for window cleaners, comprising a plurality of strata of rubber and an imperforate flexible strip of textile material between the strata, each of the outermost strata of rubber comprising a plurality of members spaced from each other, the textile material being exposed and extending across the space between the members of the respective strata to form the bottom of said space.

In witness whereof, I have hereunto set my hand this 17th day of June 1905, in the presence of the subscribing witnesses.

JAMES R. LANE.

Witnesses:
C. C. FRIBLEY,
M. M. BLISS.